(12) United States Patent
Privett

(10) Patent No.: US 6,227,745 B1
(45) Date of Patent: May 8, 2001

(54) VEHICLE WASHING DEVICE

(76) Inventor: Michael R. Privett, 6711 Peppers Ferry Rd., Max Meadows, VA (US) 24360

( * ) Notice: Subject to any disclaimer, the term of this patent is extended or adjusted under 35 U.S.C. 154(b) by 0 days.

(21) Appl. No.: 09/618,793

(22) Filed: Jul. 18, 2000

(51) Int. Cl.⁷ ................................................ A46B 11/06
(52) U.S. Cl. ..................... 401/289; 401/282; 239/316; 239/318
(58) Field of Search .................... 401/268, 270, 401/282, 289; 239/310, 316, 318, 525, 526

(56) References Cited

U.S. PATENT DOCUMENTS

| | | | |
|---|---|---|---|
| 1,565,780 | * 12/1925 | Blakey | 401/289 |
| 2,686,694 | * 8/1954 | Freeman | 401/268 |
| 2,795,460 | * 6/1957 | Bletcher et al. | |
| 3,207,444 | * 9/1965 | Kelley et al. | |
| 3,727,841 | * 4/1973 | Hengesbach | 239/145 |
| 3,989,391 | * 11/1976 | Thorner | |
| 4,314,671 | * 2/1982 | Briar | 239/311 |
| 4,899,940 | * 2/1990 | Leaver | 401/289 |
| 5,671,887 | * 9/1997 | Iavarone | |

\* cited by examiner

*Primary Examiner*—Charles R. Eloshway

(57) ABSTRACT

A vehicle washing device comprised of a hollow tube having an open first end, a closed second end, and an intermediate extent therebetween. The closed second end has a brush theresecured. A plurality of jet spray nozzles couple with the intermediate extent of the hollow first section. Contained in the device is a Y-shaped connector having an open first end coupled with the open second end of the hollow tube. The connector has an open second end with an on/off valve secured therein. An open third end has an on/off valve secured therein. The open second end is adapted to be secured to a water hose with the on/off valve selectively allowing water therethrough. Also in the device is a soap container having an extension integral therewith. The extension couples with the open third end of the Y-shaped connector. The soap container holds liquid soap therein.

4 Claims, 4 Drawing Sheets

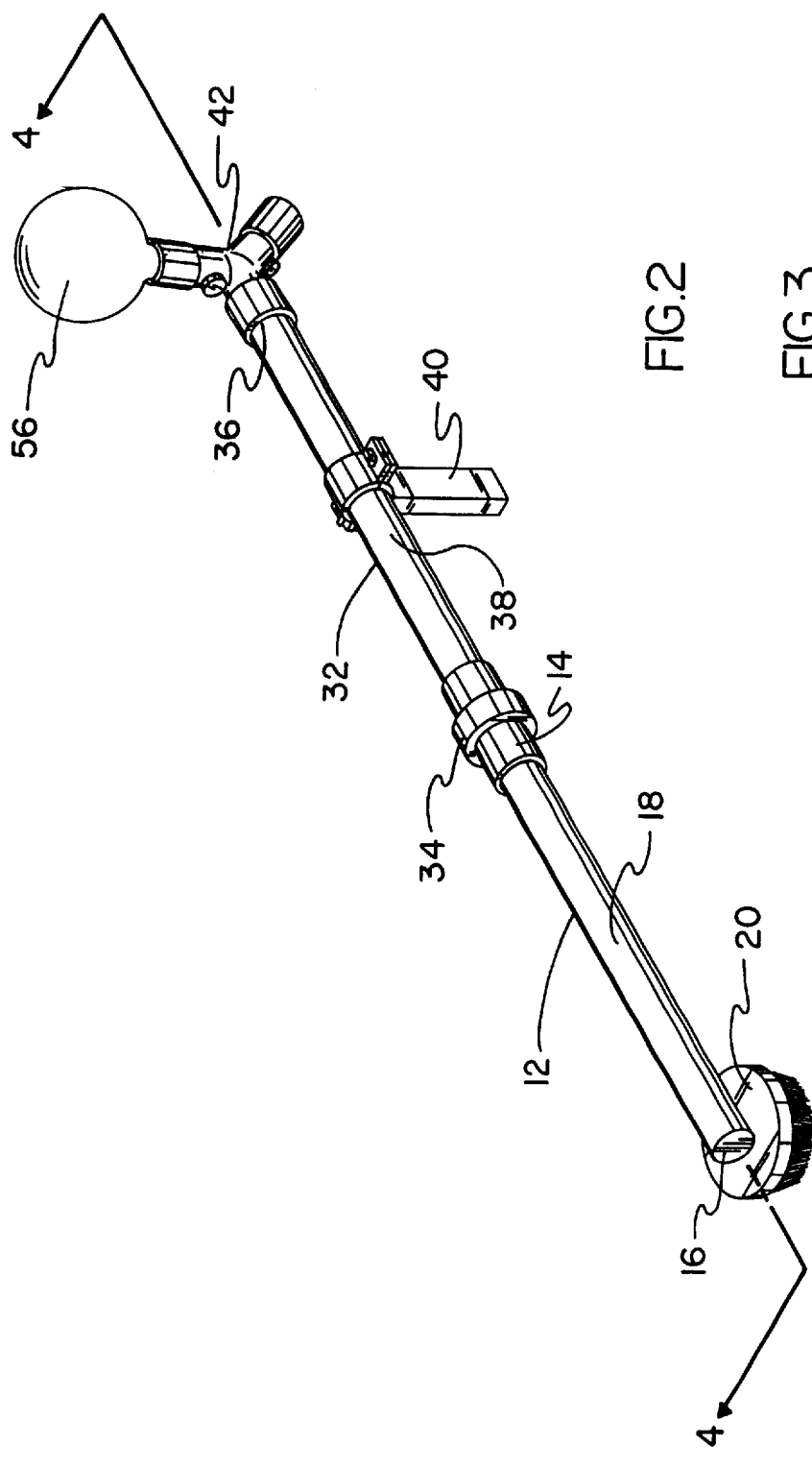
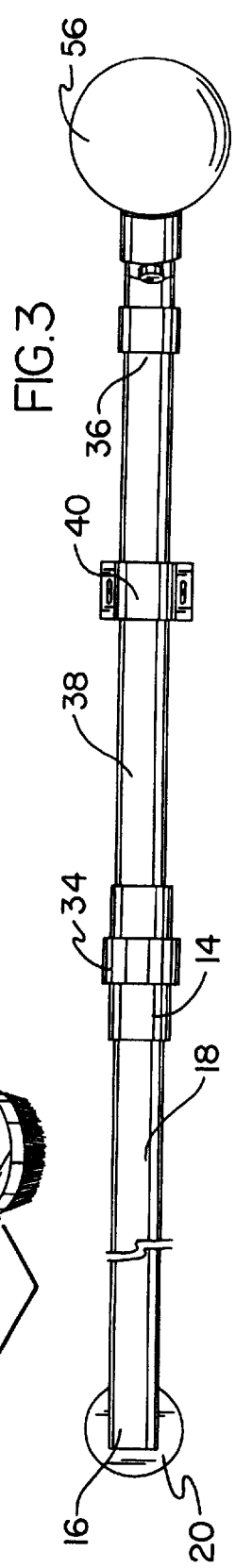
FIG.2
FIG.3

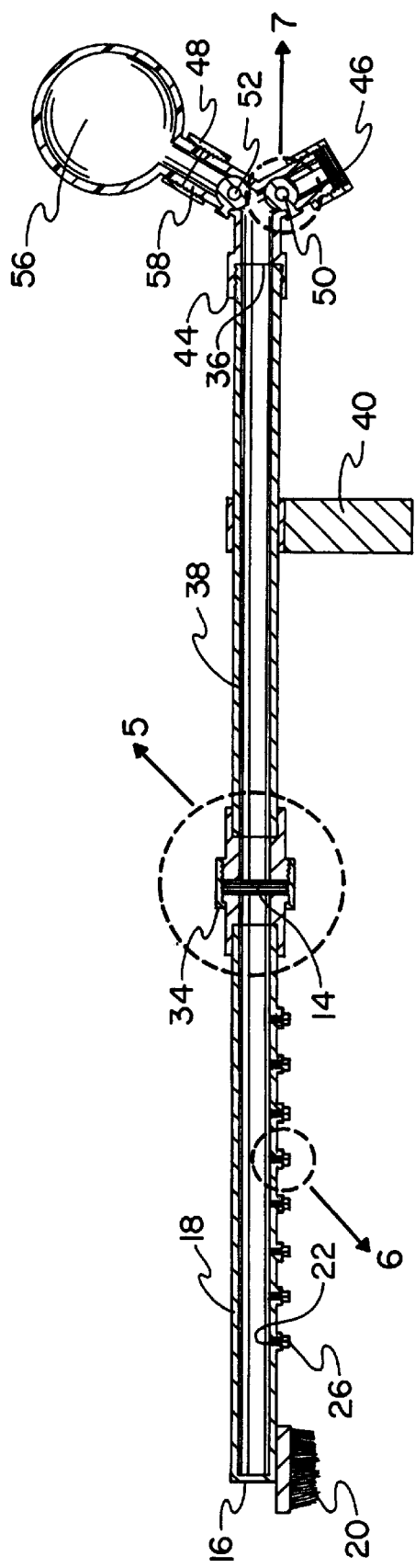
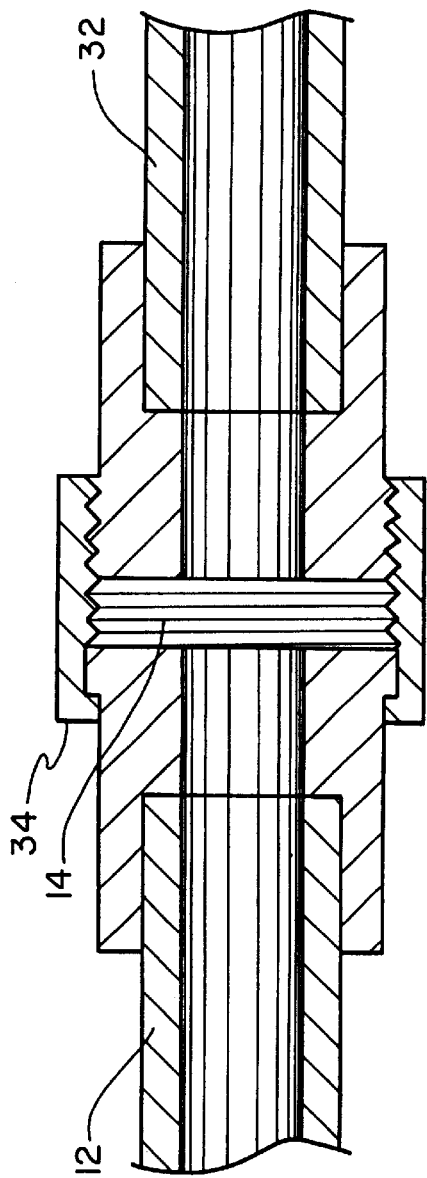
FIG. 4
FIG. 5

VEHICLE WASHING DEVICE

BACKGROUND OF THE INVENTION

1. Field of the Invention

The present invention relates to a vehicle washing device and more particularly pertains to easily cleaning all parts of a vehicle without extensive physical exertion with a vehicle washing device.

2. Description of the Prior Art

The use of washing brushes is known in the prior art. More specifically, washing brushes heretofore devised and utilized for the purpose of cleaning objects such as cars are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,988,228 to Yeh discloses a brush with extendible and retractable bristle elements.

U.S. Pat. No. 4,673,307 to Prestele et al. discloses a washing brush with adjustable head.

U.S. Pat. No. 4,614,449 to Korfgen et al. discloses a water-dispensing cleaning brush with deflecting means.

U.S. Pat. No. 3,374,444 to Zhadanov discloses a water driven brush for cars and the like.

U.S. Pat. No. 3,500,488 to Grant discloses a car wash brush.

U.S. Pat. No. 3,727,841 to Hengesbach discloses a multiple jet fluid sprinkling, spraying and diffusing device.

U.S. Pat. No. 4,314,671 to Briar discloses a pressure jet spray apparatus.

U.S. Pat. No. 3,675,851 to Merfeld et. al. discloses a high pressure washer with detergent on-off nozzle.

U.S. Pat. No. 4,899,940 to Leaver discloses a spray washing device for motor vehicles and the like.

U.S. Pat. No. 3,989,391 to Thorner discloses a car-wash device.

While these devices fulfill their respective, particular objective and requirements, the aforementioned patents do not describe a vehicle washing device for easily cleaning all parts of a vehicle without extensive physical exertion.

In this respect, the vehicle washing device according to the present invention substantially departs from the conventional concepts and designs of the prior art, and in doing so provides an apparatus primarily developed for the purpose of easily cleaning all parts of a vehicle without extensive physical exertion.

Therefore, it can be appreciated that there exists a continuing need for new and improved vehicle washing device which can be used for easily cleaning all parts of a vehicle without extensive physical exertion. In this regard, the present invention substantially fulfills this need.

SUMMARY OF THE INVENTION

In the view of the foregoing disadvantages inherent in the known types of washing brushes now present in the prior art, the present invention provides an improved vehicle washing device. As such, the general purpose of the present invention, which will be described subsequently in greater detail, is to provide a new and improved vehicle washing device and method which has all the advantages of the prior art and none of the disadvantages.

To attain this, the present invention essentially comprises a hollow first section having an open first end, a closed second end, and an intermediate extent therebetween. The open first end is internally threaded. The closed second end has a downwardly facing brush theresecured. The intermediate extent has a plurality internally threaded openings formed linearly therein. The device contains a plurality of downwardly facing jet sprays. Each of the jet sprays has an externally threaded end portion. The externally threaded end portion couples with the plurality internally threaded openings formed in the intermediate extent of the first section. The device contains a hollow second section having an open first end, an open second end, and an intermediate extent therebetween. The open first end is externally threaded. The externally threaded open first end is removably coupling with the internally threaded open first end of the hollow first section. The open second is externally threaded. The intermediate extent has a downwardly extending handle secured thereto, the first and second sections being linear and co-axial over their entire lengths. The device contains a Y-shaped connector having an internally threaded open first end, an internally threaded open second end, and an internally threaded open third end. The internally threaded open first end couples with the externally threaded open second end of the second section. The open second end has an on/off valve secured therein. The open third end has an on/off valve secured therein. The open second end is adapted to be secured to an externally threaded water hose with the on/off valve selectively allowing water therethrough. The device contains a soap container having an externally threaded open extension integral therewith. The externally threaded open extension couples with the internally threaded open third end of the Y-shaped connector. The soap container holds liquid soap therein.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle washing device which has all the advantages of the prior art washing brushes and none of the disadvantages.

It is another object of the present invention to provide a new and improved vehicle washing device which may be easily and efficiently manufactured and marketed.

It is a further object of the present invention to provide a new and improved vehicle washing device which is of durable and reliable construction.

An even further object of the present invention is to provide a new and improved vehicle washing device which is susceptible of a low cost of manufacture with regard to both materials and labor, and which accordingly is then susceptible of low prices of sale to the consuming public, thereby making such a vehicle washing device economically available to the buying public.

Still yet another object of the present invention is to provide a new and improved vehicle washing device which provides in the apparatuses and methods of the prior art some of the advantages thereof, while simultaneously overcoming some of the disadvantages normally associated therewith.

Even still another object of the present invention is to provide a new and improved vehicle washing device for easily cleaning all parts of a vehicle without extensive physical exertion.

Lastly, it is an object of the present invention to provide a new and improved vehicle washing device comprised of a hollow tube having an open first end, a closed second end, and an intermediate extent therebetween. The closed second end has a brush theresecured. A plurality of jet spray couple with the intermediate extent of the hollow first section. Contained in the device is a Y-shaped connector having an open first end coupled with the open second end of the hollow tube. The connector has an open second end with an on/off valve secured therein. An open third end has an on/off valve secured therein. The open second end is adapted to be secured to a water hose with the on/off valve selectively allowing water therethrough. Also in the device is a soap container having an extension integral therewith. The extension couples with the open third end of the Y-shaped connector. The soap container holds liquid soap therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a perspective view of the preferred embodiment of the vehicle washing device constructed in accordance with the principles of the present invention.

FIG. 3 is a plan view of the preferred embodiment of the present invention.

FIG. 4 is a cross-sectional view as taken along line 4—4 of FIG. 2.

FIG. 5 is a cross-sectional view as taken along line 5—5 of FIG. 4.

The same reference numerals refer to the same parts through the various Figures.

DESCRIPTION OF THE PREFERRED EMBODIMENT

Figure 1:
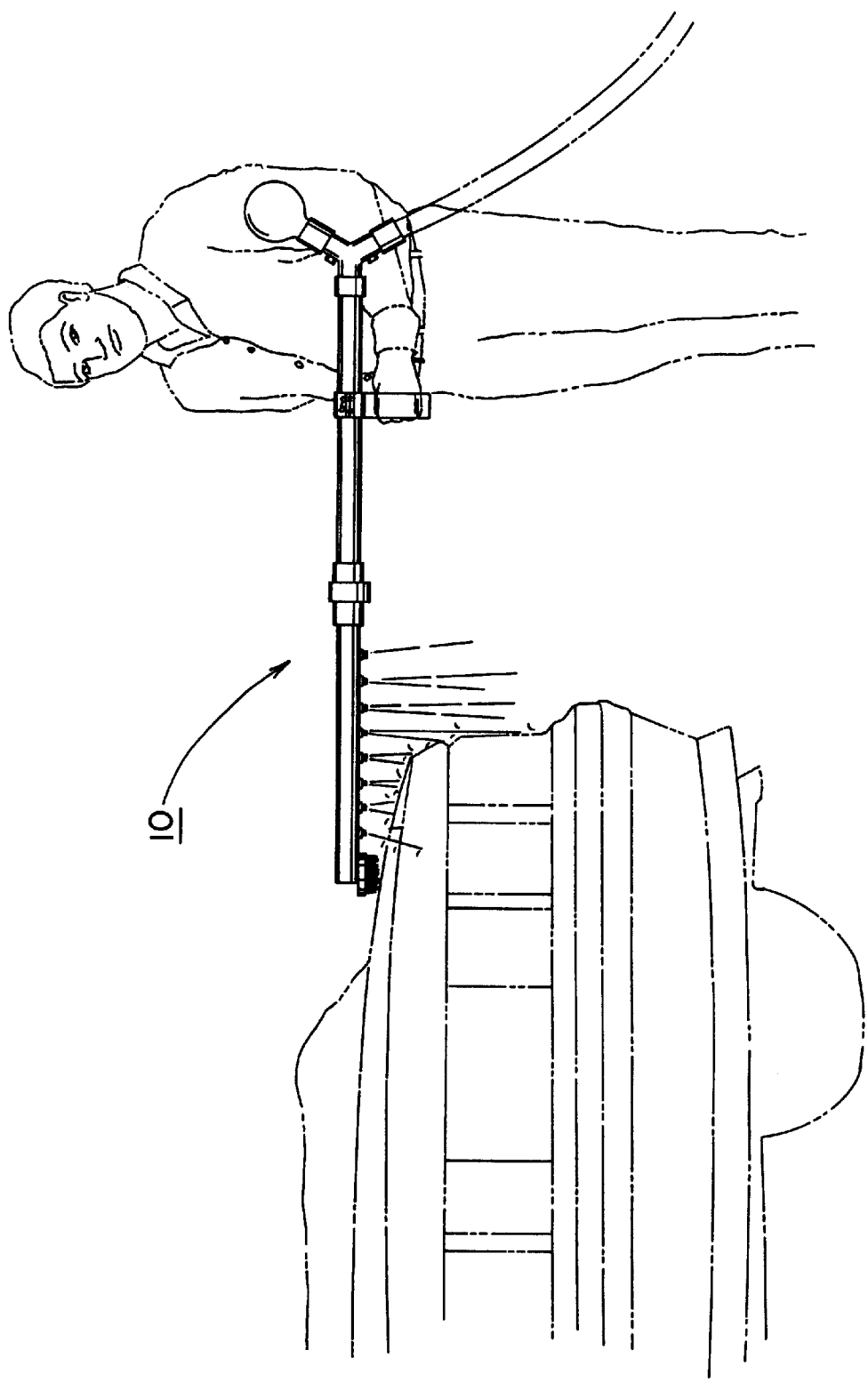
FIG. 1 is a side elevation view of the present invention in use.
Figure 6:
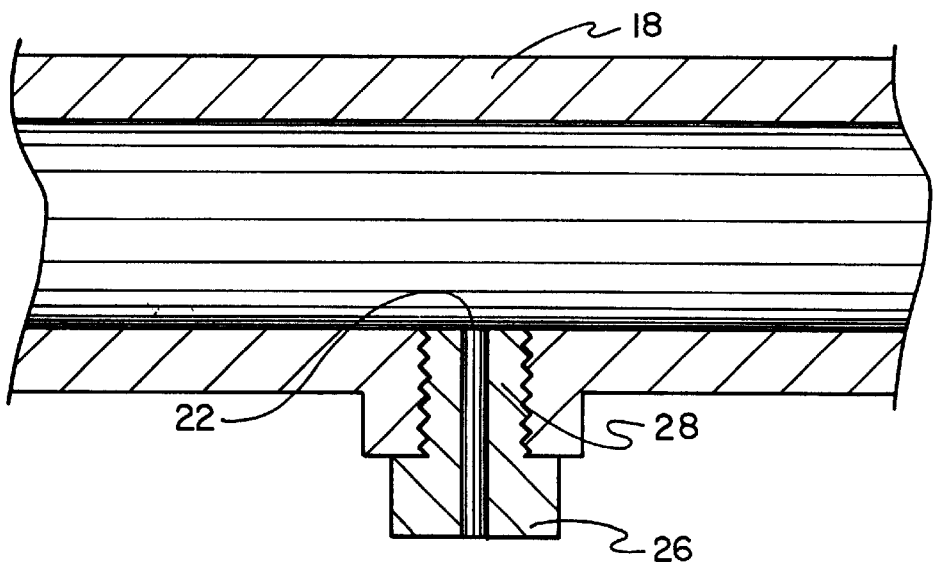
FIG. 6 is a cross-sectional view as taken along line 6—6 of FIG. 4.
Figure 7:
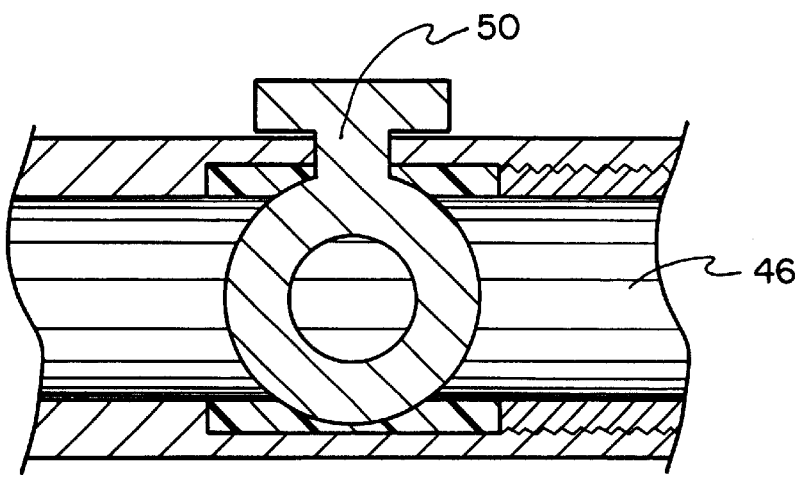
FIG. 7 is a cross-sectional view as taken along line 7—7 of FIG. 4.

With reference now to the drawings, and in particular, to FIG. 2 thereof, the preferred embodiment of the new and improved vehicle washing device embodying the principles and concepts of the present invention and generally designated by the reference number 10 will be described.

Specifically, it will be noted in the various Figures that the device relates to a new and improved vehicle washing device for easily cleaning all parts of a vehicle without extensive physical exertion. In its broadest context, the device consists of a hollow first section, a plurality of jet sprays, a hollow second section, a Y-shaped connector, and a soap container.

The device 10 contains a hollow first section 12 having an open first end 14, a closed second end 16, and an intermediate extent 18 therebetween. The open first end 14 is internally threaded. The closed second end 16 has a brush 20 theresecured. The brush 20 is used to allow the user to scrub and clean the vehicle. The intermediate extent 18 has a plurality internally threaded openings 22 formed linearly therein.

The device 10 contains a plurality of jet sprays 26. Each of the jet sprays 26 has an externally threaded end portion 28. The externally threaded end portion 28 couples with the plurality internally threaded openings 22 formed in the intermediate extent 18 of the first section 12. In the preferred embodiment, the number of jet sprays employed is fourteen, allowing water to be sprayed outwardly to clean the vehicle.

The device 10 contains a hollow second section 32 having an open first end 34, an open second end 36, and an intermediate extent 38 therebetween. The open first end 34 is externally threaded. The externally threaded open first end 34 is removably coupled with the internally threaded open first end 14 of the hollow first section 12. This allows the device 10 to be detached and easily stored in the trunk of the vehicle or on a shelf in a garage. The open second end 36 is externally threaded. The intermediate extent 38 has a handle 40 secured thereto. The handle 40 allows the user to easily manipulate the device 10.

The device 10 contains a Y-shaped connector 42 having an internally threaded open first end 44, an internally threaded open second end 46, and an internally threaded open third end 48. The internally threaded open first end 44 couples with the externally threaded open second end 36 of the second section 32. The open second end 46 has an on/off valve 50 secured therein. The open third end 48 has an on/off valve 52 secured therein. The open second end 46 is adapted to be secured to an externally threaded water hose with the on/off valve 50 selectively allowing water therethrough.

The device 10 contains a soap container 56 having an externally threaded open extension 58 integral therewith.

The externally threaded open extension 58 couples with the internally threaded open third end 48 of the Y-shaped connector 42. The soap container 56 holds liquid soap therein. The on/off valve 52 in the open third end 48 controls the amount of liquid soap dispensed within the device 10.

The present invention is a long handled brush with fourteen tiny water jets which make it ideal for washing vehicles, including the underside, to remove road salt and harmful materials.

The brush is about seven feet long and made in two sections which are joined together with a union fitting. A Y-shaped hose connection 42 is provided at the inlet, enabling attachment of a small soap container 56. The brush 20 on the opposite end has fourteen holes 11 adjacent to it in a linear array along the handle, and the whole unit is detachable. Control valves are incorporated for both the soap and the water, and a handle 40 extends out at a right angle for easy manipulation of the unit.

At most water pressures the jets spray out about fourteen feet, enabling them to deliver powerful streams which effectively clean the underside of a vehicle without the user having to crawl underneath. The brush can be quickly removed and other accessories added. A small steady amount of soap is aspirated into the water to provide a mixture which cleans the vehicle thoroughly. Both the water and soap flow can be varied to produce the best results, using a minimum amount of soap.

The brush is made in sections, allowing it to be broken down easily for compact storage. Components are made of aluminum and plastic permitting the unit to be very light in weight and easily maneuverable. A larger model could be offered for trucks and other equipment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A vehicle washing device for easily cleaning all parts of a vehicle without extensive physical exertion comprising, in combination:

a hollow first section having an open first end, a closed second end, and an intermediate extent therebetween, the open first end being internally threaded, the closed second end having a downwardly facing brush theresecured, the intermediate extent having a plurality of internally threaded openings formed linearly therein;

a plurality of downwardly facing jet spray nozzles, each of the jet spray nozzles having a externally threaded end portions, the externally threaded end portions coupling with the plurality of internally threaded openings formed in the intermediate extent of the first section;

a hollow second section having an open first end, an open second end, and an intermediate extent therebetween, the open first end being externally threaded, the externally threaded open first end removably coupling with the internally threaded open first end of the hollow first section, the open second end being externally threaded, the intermediate extent having a downwardly extending handle secured thereto, the first and second sections being linear and co-axial over their entire lengths;

a Y-shaped connector having an internally threaded open first end, an internally threaded open second end, and an internally threaded open third end, the open internally threaded first end coupling with the externally threaded open second end of the second section, the open second end having an on/off valve secured therein, the open third end having an on/off valve secured therein, the open second end adapted to be secured to an externally threaded water hose with the on/off valve selectively allowing water therethrough;

a soap container having an externally threaded open extension integral therewith, the externally threaded open extension coupling with the internally threaded open third end of the Y-shaped connector, the soap container holding liquid soap therein.

2. A vehicle washing device for easily cleaning all parts of a vehicle without extensive physical exertion comprising, in combination:

a hollow tube having an open first end, a closed second end, and an intermediate extent therebetween, the closed second end having a brush theresecured;

a plurality of jet spray nozzles coupled to the intermediate extent of the hollow first section and longitudinally spaced from the brush;

a Y-shaped connector having an open first end coupling with the open second end of the hollow tube, the connector having an open second end with an on/off valve secured therein, the connector having an open third end with an on/off valve secured therein, the open second end adapted to be secured to a water hose with the on/off valve selectively allowing water therethrough;

a soap container having an extension integral therewith, the extension coupling with the open third end of the Y-shaped connector, the soap container holding liquid soap therein.

3. The device as described in claim 2 wherein the hollow tube being separable into two hollow sections.

4. The device as described in claim 3 and further including a handle secured to one of the two hollow sections of the hollow tube.

* * * * *